US009184584B2

(12) United States Patent  
Wagoner et al.

(10) Patent No.: US 9,184,584 B2  
(45) Date of Patent: Nov. 10, 2015

(54) DEVICE AND SYSTEM FOR REDUCING OVERVOLTAGE DAMANGE

(75) Inventors: Robert Gregory Wagoner, Roanoke, VA (US); Petar Jovan Grbovic, Ismaning (DE)

(73) Assignee: General Electric Company, Schenectady, NY (US)

( * ) Notice: Subject to any disclaimer, the term of this patent is extended or adjusted under 35 U.S.C. 154(b) by 959 days.

(21) Appl. No.: 13/339,749

(22) Filed: Dec. 29, 2011

(65) Prior Publication Data

US 2013/0169068 A1 Jul. 4, 2013

(51) Int. Cl.
*H01H 47/00* (2006.01)
*H02H 7/10* (2006.01)
*H02H 3/00* (2006.01)
*H02H 9/04* (2006.01)

(52) U.S. Cl.
CPC ............... *H02H 7/10* (2013.01); *H02H 3/003* (2013.01); *H02H 9/041* (2013.01); *Y10T 307/74* (2015.04); *Y10T 307/832* (2015.04)

(58) Field of Classification Search
CPC .......... H02H 3/003; H02H 9/041; H02H 7/10
USPC ............................................. 307/126
See application file for complete search history.

(56) References Cited

U.S. PATENT DOCUMENTS

| | | | | | |
|---|---|---|---|---|---|
| 5,570,260 | A | * | 10/1996 | Kanai et al. | 361/91.8 |
| 5,969,509 | A | * | 10/1999 | Thorvaldsson | 323/210 |
| 5,991,327 | A | * | 11/1999 | Kojori | 373/104 |
| 2008/0143182 | A1 | * | 6/2008 | Raju | 307/26 |
| 2008/0239592 | A1 | | 10/2008 | Roscoe et al. | |
| 2009/0161272 | A1 | | 6/2009 | Asokan et al. | |
| 2009/0322083 | A1 | | 12/2009 | Wagoner et al. | |
| 2010/0091417 | A1 | * | 4/2010 | Letas | 361/21 |
| 2010/0134935 | A1 | | 6/2010 | Ritter et al. | |
| 2010/0321838 | A1 | | 12/2010 | Wu et al. | |
| 2010/0328824 | A1 | | 12/2010 | Roscoe | |
| 2011/0026286 | A1 | * | 2/2011 | Liu et al. | 363/140 |
| 2011/0141637 | A1 | | 6/2011 | Klodowski | |
| 2011/0141641 | A1 | | 6/2011 | Walling et al. | |
| 2011/0170218 | A1 | * | 7/2011 | Claude et al. | 361/30 |
| 2011/0267862 | A1 | | 11/2011 | Roesner et al. | |

OTHER PUBLICATIONS

International search report issued in connection with PCT/US2012/071960, May 8, 2013.

* cited by examiner

*Primary Examiner* — Jared Fureman
*Assistant Examiner* — Duc M Pham
(74) *Attorney, Agent, or Firm* — Fletcher Yoder, P.C.

(57) ABSTRACT

A device includes a first thyristor element configured to be coupled to a first voltage line and a second voltage line, wherein the first voltage line is configured to transmit power in a first phase and the second voltage line is configured to transmit power in a second phase. The device includes a second thyristor element configured to be coupled to the second voltage line and a third voltage line, wherein the third voltage line is configured to transmit power in a third phase. The device includes a third thyristor element configured to be coupled to the first voltage line and the third voltage line.

10 Claims, 4 Drawing Sheets

DEVICE AND SYSTEM FOR REDUCING OVERVOLTAGE DAMANGE

The subject matter disclosed herein relates to a device and system for reducing damages to a voltage converter of a power generation system caused by an overvoltage condition.

Modern power systems are becoming increasingly interconnected to each other. For example, power generation systems, such as wind or solar power generation plants, may connect to a network or grid to provide power usable by one or more customers. However, voltages from the grid may cause an overvoltage condition on the power generation systems from that same grid, which may lead to damage of the power generation system. Accordingly, a circuit, such as a crowbar circuit, may be implemented between the grid and the power generation system. However, as the crowbar circuit may add overhead, for example, in the form of space and cost, it may be desirable to implement a simplified crowbar circuit that can protect the power generation system from damage caused by overvoltage condition from the grid at the power generation system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a device includes a first thyristor element configured to be coupled to a first voltage line and a second voltage line, wherein the first voltage line is configured to transmit power in a first phase and the second voltage line is configured to transmit power in a second phase, a second thyristor element configured to be coupled to the second voltage line and a third voltage line, wherein the third voltage line is configured to transmit power in a third phase, and a third thyristor element configured to be coupled to the first voltage line and the third voltage line.

In a second embodiment, system includes a controller configured to transmit a first activation signal to activate a first thyristor element coupled to a first voltage line and a second voltage line, wherein the first voltage line is configured to transmit power in a first phase and the second voltage line is configured to transmit power in a second phase, transmit a second activation signal to activate a second thyristor element coupled to the second voltage line and a third voltage line, wherein the third voltage line is configured to transmit power in a third phase, and transmit a third activation signal to activate a third thyristor element coupled to the first voltage line and the third voltage line.

In a third embodiment, a non-transitory computer readable medium includes computer-readable instructions to cause a controller to receive input signals related to power passing through a power line, and generate an activation signal configured to activate a first thyristor element coupled to a first voltage line and a second voltage line, wherein the first voltage line is configured to transmit power in a first phase and the second voltage line is configured to transmit power in a second phase, activate a second thyristor element coupled to the second voltage line and a third voltage line, wherein the third voltage line is configured to transmit power in a third phase, and activate the third thyristor element coupled to the first voltage line and the third voltage line; and transmit the activation signal to each of the first thyristor element, the second thyristor element, and the third thyristor element simultaneously.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments relate to a power network that includes a crowbar circuit located between a power generation system, such as wind or solar power generation plant, and a network electricity grid. The crowbar circuit may aid in reducing the propensity an overvoltage or overcurrent condition reaching a power generation system, or of a converter coupled thereto, which might otherwise damage the power generation system and/or the converter. In one embodiment, the crowbar may utilize a thyristor for each voltage line carrying voltage of a distinct phase. For example, three thyristors, such as silicon controlled rectifiers, may be utilized to short circuit voltage being transmitted from a grid to a power generation system in a three-phase power system. This may be accomplished by aligning the thyristors such that every thyristor is connected to two voltage lines carrying voltage of differing phases. In this manner, three-phase voltage being transmitted on separate voltage lines may be transmitted through at least one of the thyristors, regardless of its phase, to short circuit the voltage lines when a fault has been detected.

Figure 1:
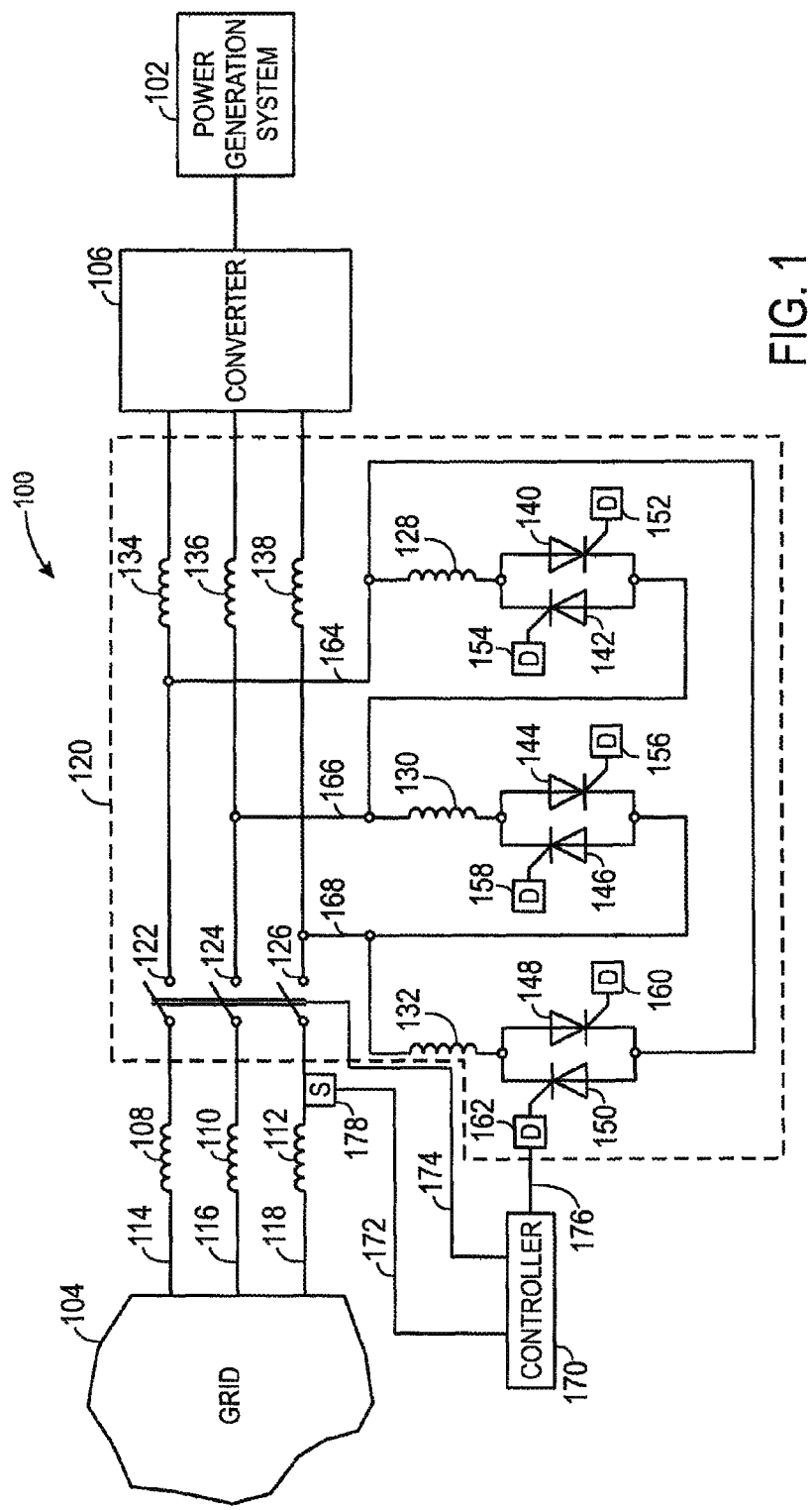
FIG. 1 is a block diagram of a power network that includes a crowbar circuit, in accordance with an embodiment.

With the foregoing in mind, FIG. 1 represents a power network 100. The power network 100 may include a power generation system 102. The power generation system 102 may represent one or more power plants powered by, for example, wind turbines, solar energy, nuclear fission, burning of fossil fuels (such as coal or natural gas), or the like. Accordingly, power generation system 102 may generate electricity for transmission to the power network 100 via a power grid 104, which may include, for example, power lines (e.g., high voltage power lines), substations (e.g., to step down voltage of the electricity received), and distribution lines (e.g., power lines that distribute electricity from the substation to residential and/or commercial customers).

Prior to electricity being transmitted to the power grid 104, the electricity generated by the power generation system 102 may be transmitted through a converter 106 and through inductance elements 108, 110, and 112 on voltage lines 114, 116, and 116, respectively. The converter 106 may include, for example, voltage conversion elements, such as one or more step up and/or step down transformers that may alter the voltage generated by the power generation system 102 to a desired voltage for transmission on the grid 104. Additionally or alternatively, the converter 106 may include an inverter to convert the voltage received from the power generation system 102 from direct current to alternating current. This inverter may be, for example, a three-level bridge inverter utilizing, for example, Neutral-Point-Clamp topology or Neutral-Point-Pivot topology. In another embodiment, the inverter may be, for example, a two-level bridge inverter. Through utilization of an inverter in the converter 106, power transmitted from the converter 106 may be alternating current (AC) power that may be transmitted at, for example, approximately 50 Hz or 60 Hz at approximately, for example, 1 megawatt, 3 megawatts, 5 megawatts, or more.

Moreover, the power transmitted from the converter 106 may be, for example, three-phase power. That is, three voltage lines 114, 116, and 118 are present in FIG. 1 to denote that the power transmitted from the power generation system 102 has been converted by the converter 106 to three-phase power AC power, for example. Three-phase power may include power with three alternating currents (e.g., of the same frequency), such that each of the currents reaches its instantaneous peak value at a time different than the other two currents. For example, the power transmitted on power line 114 may be referred to phase A power, the power transmitted on power line 116 may be referred to phase B power, and the power transmitted on power line 118 may be referred to phase C power. Taking phase A power as a reference, phase B power may be delayed in time by one-third of one cycle. Similarly, Phase C power may be delayed in time by one-third of one cycle from phase B power and two-thirds of one cycle from phase A power. That is, phase A, B, and C power may be out of phase by 120° from each other.

Returning to FIG. 1, inductance elements 108, 110, and 112 may be present on voltage lines 114, 116, and 118, respectively. These inductance elements 108, 110, and 112 may model line impedances inherently present on voltage lines 114, 116, and 118 and/or may represent transformers for transforming the voltage from the converter 106 prior to transmission on the grid 104. In one embodiment, the impedance values of the inductance elements 108, 110, and 112 may be approximately, for example, between 20 µH and 200 µH. In another embodiment, the impedance values of the inductance elements 108, 110, and 112 may be approximately, for example, 20 µH, 30 µH, 40 µH, 50 µH, 60 µH, 70 µH, 80 µH, 90 µH, 100 µH, 125 µH, 150 µH, 175 µH, or 200 µH.

While power may flow from the power generation system 102 to the converter 106 to the grid 104, in some circumstances, power may also flow from the grid 104 into the converter 106. This may lead to damage as well as failures of the converter 106 and/or elements in the power generation system 102. To avoid these damages from occurring, a crowbar circuit 120 may be implemented. In some embodiments, the crowbar circuit 120 may include switching elements 122, 124, and 126, crowbar inductance elements 128, 130, and 132, filter elements 134, 136, and 138, and thyristor elements 140, 142, 144, 146, 148, and 150.

The switching elements 122, 124, and 126 may be switches that cause an open circuit to occur on voltage lines 114, 116, and 118. For example, the switching circuits 122, 124, and 126 may each include one or more fuses that blow when, for example, excess current is passed through the fuse, causing an open circuit to occur on voltage lines 114, 116, and 118 between the grid 104 and the converter 106. In another embodiment, the switching elements 122, 124, and 126 may each include a circuit breaker. This circuit breaker may be an electrical switch designed to automatically detect a fault condition and interrupt continuity of the voltage lines 114, 116, and 118. Alternatively, the circuit breaker may receive a signal that causes the circuit breaker to trip, causing an interrupt continuity of the voltage lines 114, 116, and 118. By interrupting continuity of the voltage lines 114, 116, and 118, an open circuit is generated, thus discontinuing electrical flow between the grid 104 and the converter 106.

As noted above, the crowbar circuit 120 may also include crowbar inductance elements 128, 130, and 132. Crowbar inductance elements 128, 130, and 132 may represent, for example, line impedances inherently present in voltage lines 164, 166, and 168. In one embodiment, crowbar inductance elements 128, 130, and 132 may range from approximately 5 µH to 40 µH. In another embodiment, the impedance values of the inductance elements 128, 130, and 132 may be approximately, for example, 5 µH, 10 µH, 15 µH, 20 µH, 25 µH, 30 µH, 35 µH, or 40 µH.

Additionally, the crowbar circuit may include filter elements 134, 136, and 138. Alternatively, filter elements 134, 136, and 138 may instead reside in the converter 106. The filter elements 134, 136, and 138 may operate to reduce the frequency of the alternating current exiting the converter 106. For example, the power transmitted from the converter 106 may be alternating current (AC) power at, for example, approximately 50 Hz or 60 Hz. Each of the filter elements 134, 136, and 138 may eliminate higher spectral components from signal spectra provided to it. In this manner, the filtering elements 134, 136, and 138 operate to provide three-phase power at approximately 480V, 690V, 1380V, or another voltage at approximately 60 Hz to the grid 104. Each of the filter elements 134, 136, and 138 have been modeled as impedances in FIG. 1 and, in one embodiment, the impedance values for each of the filter elements 134, 136, and 138 may range between approximately, for example, 100 and 300 µH.

As described above, the crowbar circuit 120 includes switching elements 122, 124, and 126 that may operate to generate an open circuit to cut off the electrical connection between the converter 106 and the grid 104. However, this process may take, for example, approximately 100 milliseconds to occur. During this time, the converter 106 may be exposed to a power surge that may impair operation of or otherwise damage the converter 106. Accordingly, the crowbar circuit 120 may also include thyristor elements 140, 142, 144, 146, 148, and 150 to aid in protection of the converter 106 and power generation system 102 from power flowing from the grid 104.

The thyristor elements 140, 142, 144, 146, 148, and 150 (hereinafter referred to collectively as thyristor elements 140-150) may operate by generating a short circuit (e.g., a low resistance path) across a voltage source (such as the grid 104). In one embodiment, the thyristor elements 140-150 may be regenerative gating devices, such as silicon controlled rectifiers (SCRs), integrated gate commutated thyristors (IGCTs), gate turn-off thyristors (GTOs), or other similar semiconductor devices. These thyristor elements 140-150 may act as gated bistable switches, whereby the thyristor elements 140-150 conduct current when their respective gates receive a current trigger and continue to conduct current while forward biased.

Accordingly, each of the thyristor elements 140-150 is coupled to a gate drive element, 152, 154, 156, 158, 160, or 162 (hereinafter collectively referred to as gate drive elements 152-162). These gate drive elements 152-162 may provide a signal to the gates of the respective thyristor elements 140-150 associated therewith to activate the thyristor elements 140-150. Thus, when the thyristor elements 140-150 are activated by the gate drive elements 152-162, current may flow through voltage lines 164, 166, and 168.

In one embodiment, the activation of the gate drive elements 152-162 is controlled by a controller 170. This controller 170 may include one or more microprocessors, such as one or more "general-purpose" microprocessors, one or more special-purpose microprocessors and/or ASICS, or some combination thereof. Furthermore, the controller 170 may execute one or more algorithms, which may be stored on a tangible non-transitory machine readable medium, such as volatile memory (e.g., random access memory), and/or non-volatile memory (e.g. read-only memory). This memory may be internal to or directly coupled to the controller 170.

Moreover, the controller 170 may be coupled to various elements via signal lines 172, 174, and 176. For example, signal line 172 allows the controller 170 to receive signals from a sensor 178. These signals received from the sensor 178 may indicate, for example, that power has been measured passing from the grid 104 towards the crowbar circuit 120. Accordingly, one step of an algorithm that may be executed by the controller 170 is to receive these signals from the sensor 178. The algorithm may also include instructions for determining if the received signals indicate that power above a threshold has been reached. A subsequent step of the algorithm executed by the controller 170 (subsequent to determining that either signals have been received or that the signals exceed a threshold) may include instructions that cause the controller 170 to send a signal along path 174 to each of the switching elements 122, 124, and 126. This signal sent to the switching elements 122, 124, and 126 may cause the switching elements 122, 124, and 126 to interrupt the continuous connection (e.g., break) in the electrical path between the grid 104 and the converter 106.

Simultaneous to or before sending the signal to the switching elements 122, 124, and 126, the algorithm executed by the controller 170 may include instructions that cause the controller 170 to send a signal along path 176 to each of the gate drive elements 152-162. This signal sent along path 174 cause the gate drive elements 152-162 to activate the thyristor elements 140-150 simultaneously. Activation of the thyristor elements 140-150 may cause a short circuit to occur in the crowbar circuit 120 faster than the switching elements 122, 124, and 126 may be activated to generate an open circuit. In one embodiment, the activation of the thyristor elements 140-150 may be accomplished in approximately, for example, between 50 microseconds and 100 microseconds. In another embodiment, activation of the thyristor elements 140-150 may be accomplished in less than or equal to approximately, for example, 50 microseconds, 60 microseconds, 70 microseconds, 80 microseconds, 90 microseconds, 100 microseconds.

It should be noted that the thyristor elements 140-150 of the crowbar circuit 120 are grouped into pairs. For example, thyristor elements 140 and 142 are coupled to voltage line 164 to receive, for example, phase A voltage, thyristor elements 144 and 146 are coupled to voltage line 166 to receive, for example, phase B voltage, and thyristor elements 148 and 150 are coupled to voltage line 168 to receive, for example, phase C voltage. In this setup, regardless of whether the voltage along voltage lines 164, 166, and 168 is positive or negative, when the thyristor elements 140-150 are activated by the gate drive elements 152-162, current flows through one of the thyristor elements 140-150 in each group. For example, if the phase A voltage on voltage line 164 is positive when gating elements 152 and 154 are activated, voltage passes through thyristor 140 while being resisted by thyristor 142. Conversely, if the phase A voltage on voltage line 164 is negative when gating elements 152 and 154 are activated, voltage passes through thyristor 142 while being resisted by thyristor 140. This process occurs for each of the pairs of thyristor elements 140-150, allowing short circuits to be generated regardless of the polarity (e.g., positive or negative) of the voltage transmitted along power lines 164, 166, and 168. The result of activation of the thyristor elements 140-150 may be seen with respect to FIG. 2.

Figure 2:
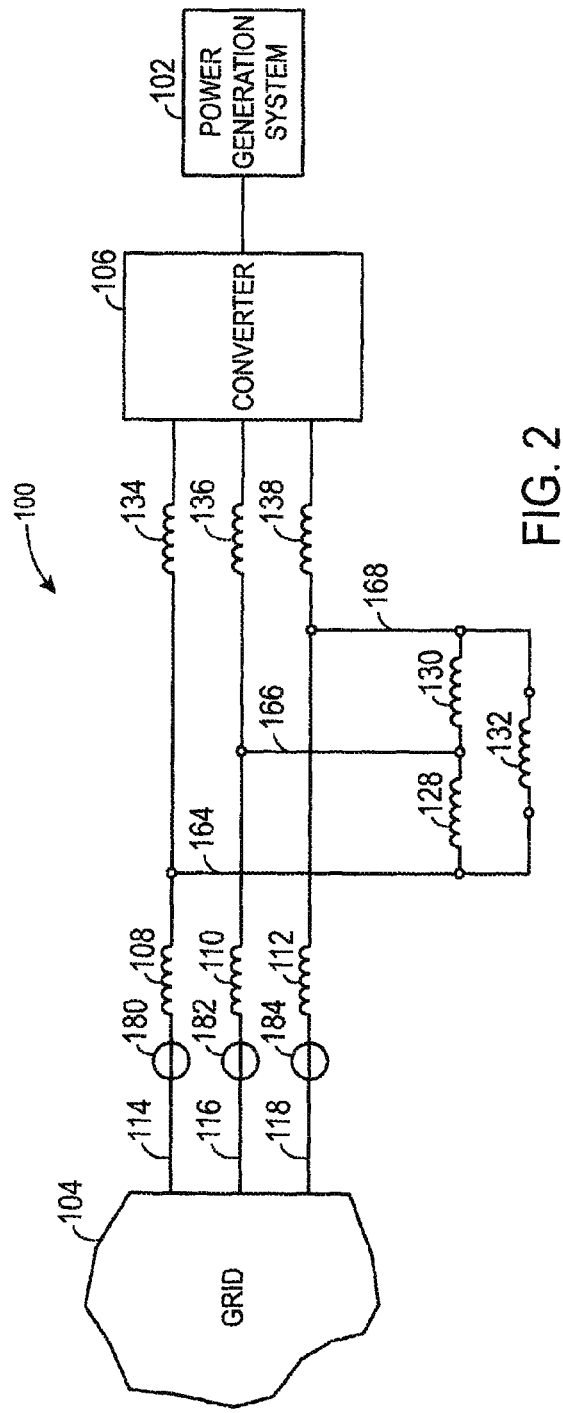
FIG. 2 is an equivalent block diagram of the power network of FIG. 1 whereby the crowbar circuit is activated, in accordance with an embodiment.

FIG. 2 illustrates an equivalent circuit diagram of the power network 100 after the thyristor elements 140-150 have been activated. As illustrated, voltage lines 164, 166, and 168 each carry current generated by equivalent voltage sources 180, 182, and 184 to the crowbar inductance elements 128, 130, and 132. The currents carried on voltage lines 164, 166, and 168 may be approximately, for example, 10000 amps, 20000 amps, 30000 amps, 40000 amps, 50000 amps, 60000 amps, 70000 amps, 80000 amps, 90000 amps, 100000 amps, or more. In contrast, the current passing through the voltage lines 114, 116, and 118 to the converter 106 may be as small as, for example, approximately 100 amps. This condition may continue until the switching elements 122, 124, and 126 interrupt the continuous connection (e.g., break) the electrical path between the grid 104 and the converter 106 (e.g., approximately 100 milliseconds). Accordingly, during this time, the thyristor elements 140-150 discussed in FIG. 1 operate as shorting devices in crowbar circuit 120.

Figure 3:
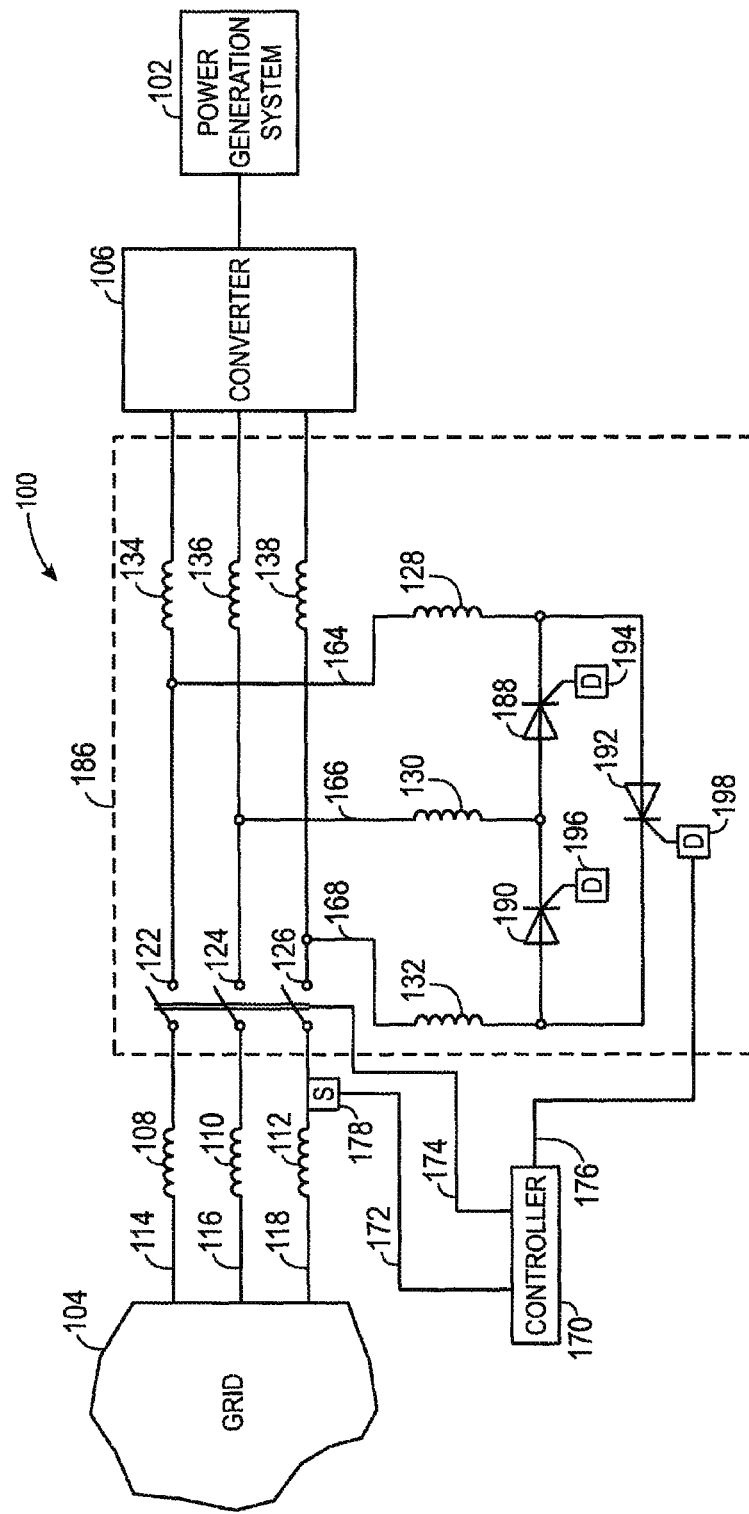
FIG. 3 is a block diagram of a power network that includes a second crowbar circuit, in accordance with a second embodiment.

FIG. 3 represents another embodiment of the power network 100. The power network 100, similar to that disclosed in FIG. 1, may include a power generation system 102, a grid 104, a converter 106, inductance elements 108, 110, and 112 on voltage lines 114, 116, and 116, controller 170, signal lines 172, 174, and 176, and a sensor 178, each of which operates as previously discussed.

Additionally, FIG. 3 includes a crowbar circuit 186. The crowbar circuit 186 is similar to crowbar circuit 120 in that it includes switching elements 122, 124, and 126, crowbar inductance elements 128, 130, and 132, filter elements 134, 136, and 138, and voltage lines 164, 166, and 168, each of which operates as previously discussed with respect to the crowbar circuit 120. However, crowbar circuit 186 differs from crowbar circuit 120 in the number and arrangement of the thyristor elements present therein.

Crowbar circuit 186 includes a thyristor element 188 coupled to voltage lines 164 and 166, a thyristor element 190 coupled to voltage lines 166 and 168, and a thyristor element 192 coupled to voltage lines 164 and 168. The thyristor elements 188, 190, and 192 may operate by generating a short circuit or low resistance path across a voltage source (such as the grid 104). In one embodiment, the thyristor elements 188, 190, and 192 may be regenerative gating devices, such as silicon controlled rectifiers (SCRs), integrated gate commutated thyristors (IGCTs), gate turn-off thyristors (GTOs), or other similar semiconductor devices. As such, the thyristor elements 188, 190, and 192 may act as gated bistable switches, such that they conduct when their gate receives a current trigger and continue to conduct while they remain forward biased. Accordingly, each of the thyristor elements 188, 190, and 192 is coupled to a gate drive element, 192, 194, or 196, respectively. These gate drive elements 192, 194, and 196 may provide a signal to the respective thyristor elements 188, 190, and 192 associated therewith to activate the thyristor elements 188, 190, and 192 when a signal along path 176 from controller 170 is received at each of the gate drive elements 192, 194, and 196. Accordingly, when the thyristor elements 188, 190, and 192 are activated, current may flow through voltage lines 164, 166, and 168.

In contrast to the crowbar circuit 120 of FIG. 1, crowbar circuit 186 does not include thyristor elements grouped into pairs. Instead each of the thyristor elements 188, 190, and 192 of the crowbar 186 are connected to two of the voltage lines 164, 166, or 168. For example, thyristor element 188 may be placed between voltage lines 164 and 166, such that when phase A voltage on voltage line 164 is negative and/or when phase B voltage on voltage line 166 is positive when gating element 194 is activated, voltage passes through thyristor element 188 to cause a short circuit. Similarly, thyristor element 190 may be placed between voltage lines 166 and 168, such that when phase B voltage on voltage line 164 is negative and/or when phase C voltage on voltage line 168 is positive when gating element 196 is activated, voltage passes through thyristor element 190 to cause a short circuit. Likewise, thyristor element 192 may be placed in between voltage lines 164 and 168, such that when phase A voltage on voltage line 164 is positive and/or when phase C voltage on voltage line 168 is negative when gating element 198 is activated, voltage passes through thyristor element 192 to cause a short circuit. In this manner, three phase voltage on separate voltage lines (e.g., voltage lines 114, 116, and 118) may be transmitted through at least one of the thyristor elements 188, 190, and 192, regardless of the phase of the voltage, to short circuit the voltage lines 114, 116, and 118. That is, regardless of whether the voltage along voltage lines 164, 166, and 168 is positive or negative, activation of the thyristor elements 188, 190, and 192 by the gate drive elements 194, 196, and 198 causes current to flow through the respective thyristor elements 194, 196, and 198. This process allows short circuits to be generated regardless of the polarity (e.g., positive or negative) of the voltage transmitted along power lines 164, 166, and 168 with a reduced number of thyristor elements 194, 196, and 198 and gate drive elements 194, 196, and 198 relative to the crowbar circuit 120. The result of activation of the thyristor elements 194, 196, and 198 may be seen with respect to FIG. 4.

Figure 4:
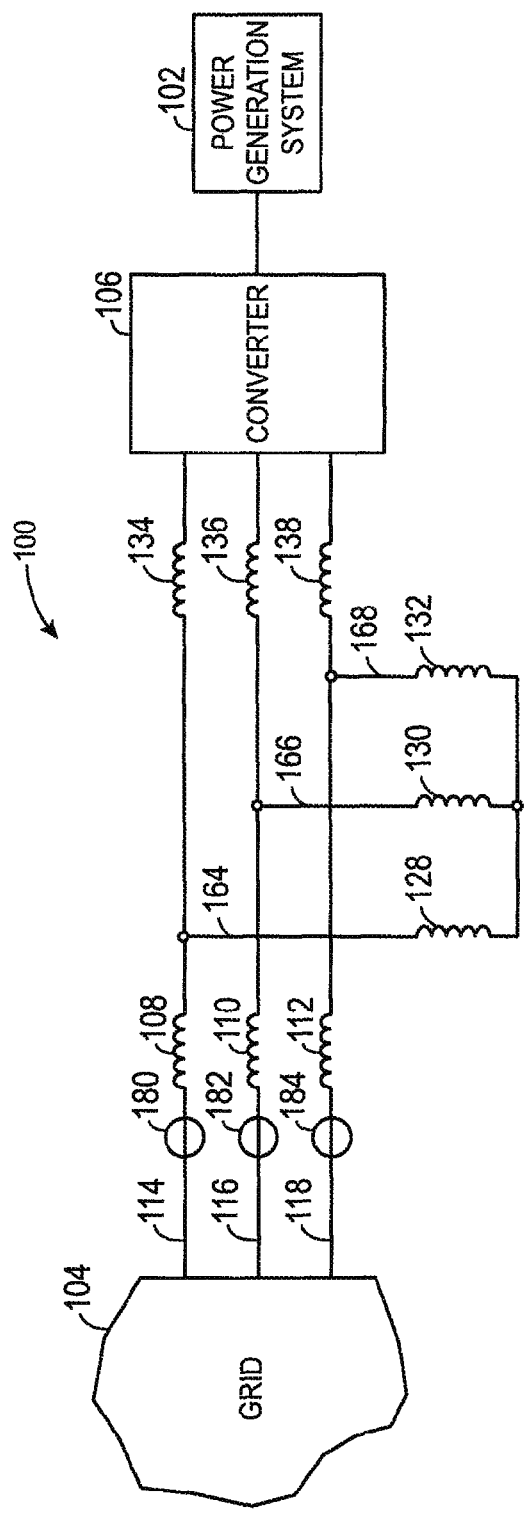
FIG. 4 is an equivalent block diagram of the power network of FIG. 3 whereby the second crowbar circuit is activated, in accordance with the second embodiment.

FIG. 4 illustrates an equivalent circuit diagram of the power network 100 of FIG. 3 after the thyristor elements 194, 196, and 198 have been activated. As illustrated, voltage lines 164, 166, and 168 each carry current generated by equivalent voltage sources 180, 182, and 184 to the crowbar inductance elements 128, 130, and 132. The currents carried on voltage lines 164, 166, and 168 may be approximately, for example, 10000 amps, 20000 amps, 30000 amps, 40000 amps, 50000 amps, 60000 amps, 70000 amps, 80000 amps, 90000 amps, 100000 amps, or more. In contrast, the current passing through the voltage lines 114, 116, and 118 to the converter may be as small as, for example, approximately 100 amps. This condition may continue until the switching elements 122, 124, and 126 interrupt the continuous connection (e.g., break) the electrical path between the grid 104 and the converter 106 (e.g., approximately 100 milliseconds). During this time, the thyristor elements 194, 196, and 198 discussed with respect to FIG. 3 operate as shorting devices in the power network 100. In this manner, the crowbar circuit 186 may achieve the same result as crowbar circuit 120 with an overall reduction in the number of thyristors and gate drive circuits, thus leading to less complexity, size, cost, and greater reliability of the crowbar circuit 186 relative to the crowbar circuit 120.

This written description uses examples to disclose the invention, including the best mode, and also to allow any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a controller, and
   a sensor coupled to the controller and configured to transmit a signal indicative of an amount of power passing along one of a first voltage line, a second voltage line, or a third voltage line, wherein the controller is configured to:
      transmit a first activation signal to activate a first thyristor element coupled to the first voltage line and the second voltage line via a first path, wherein the first path does not comprise a second thyristor element or a third thyristor element, wherein the first voltage line is configured to transmit power in a first phase and the second voltage line is configured to transmit power in a second phase;
      transmit a second activation signal to activate the second thyristor element coupled to the second voltage line and the third voltage line via a second path, wherein the second path does not comprise the first thyristor element or the third thyristor element, wherein the third voltage line is configured to transmit power in a third phase;
      transmit a third activation signal to activate the third thyristor element coupled to the first voltage line and the third voltage line via a third path, wherein the third path does not comprise the first thyristor element or the second thyristor element, wherein the device comprises no more than three thyristor elements;
      transmit the first activation signal to a first gate drive element coupled to the first thyristor element in response to the signal transmitted from the sensor;
      transmit the second activation signal to a second gate drive element coupled to the second thyristor element in response to the signal transmitted from the sensor; and
      transmit the third activation signal to a third gate drive element coupled to the third thyristor element in response to the signal transmitted from the sensor.

2. The system of claim 1, wherein the controller is configured to transmit a switching signal to a switching element coupled to one of the first voltage line, the second voltage line, or the third voltage line in response to the signal transmitted from the sensor.

3. The system of claim 1 comprising a crowbar circuit comprising each of the first thyristor element, the second thyristor element, and the third thyristor element, wherein the controller is integrated into the crowbar circuit.

4. The system of claim 3, comprising a converter configured to transmit generated electricity to a grid, wherein the converter is coupled to the crowbar circuit.

5. The system of claim 4, wherein the converter comprises a three-level bridge inverter configured to convert voltage received from a power generation system coupled to the converter from direct current to alternating current prior to transmission of the generated electricity to the grid.

6. The system of claim 5, wherein the power generation system comprises a wind or a solar power generation system.

7. The system of claim 4, wherein the converter comprises a two-level bridge inverter configured to convert voltage received from a power generation system coupled to the converter from direct current to alternating current prior to transmission of the generated electricity to the grid.

8. The system of claim 7, wherein the power generation system comprises a wind or a solar power generation system.

9. A non-transitory computer readable medium, comprising computer-readable instructions to cause a controller to:
    receive input signals related to power passing through a power line; and
    generate an activation signal configured to:
        activate a first thyristor element coupled to a first voltage line and a second voltage line via a first path, wherein the first path does not comprise a second thyristor element or a third thyristor element, wherein the first voltage line is configured to transmit power in a first phase and the second voltage line is configured to transmit power in a second phase;
        activate the second thyristor element coupled to the second voltage line and a third voltage line via a second path, wherein the second path does not comprise the first thyristor element or the third thyristor element, wherein the third voltage line is configured to transmit power in a third phase; and
        activate the third thyristor element coupled to the first voltage line and the third voltage line via a third path, wherein the third path does not comprise the first thyristor element or the second thyristor element; and
    transmit the activation signal to each of the first thyristor element, the second thyristor element, and the third thyristor element simultaneously.

10. The non-transitory computer readable medium of claim 9, comprising computer-readable instructions to cause the controller to transmit the activation signal to no more than three thyristor elements.

\* \* \* \* \*